United States Patent

[11] 3,549,016

| [72] | Inventor | Peter Nicholas Rigopulos<br>Melrose, Mass. |
|---|---|---|
| [21] | Appl. No. | 850,263 |
| [22] | Filed | Aug. 14, 1969<br>Continuation of Ser. No. 545,298,<br>Apr. 26, 1966, now abandoned. |
| [45] | Patented | Dec. 22, 1970 |
| [73] | Assignee | Amicon Corporation<br>Cambridge, Mass.<br>a corporation of Massachusetts |

[54] PERMEABLE MEMBRANE AND METHOD OF MAKING AND USING THE SAME
11 Claims, No Drawings

[52] U.S. Cl. .................................................... 210/500,
260/874
[51] Int. Cl. ...................................................... B01d 39/16

[50] Field of Search............................................ 260/2.1E,
2.2, 886; 204/180P, 296; 210/500, 321, 23

[56] References Cited
UNITED STATES PATENTS

| 3,133,132 | 5/1964 | Loeb et al...................... | 210/321UX |
|---|---|---|---|
| 3,276,598 | 10/1966 | Michaels et al............... | 210/500 |

*Primary Examiner*—Samin N. Zaharna
*Attorney*—R. W. Furlong

ABSTRACT: An anisotropic permeable membrane formed of two ionically associated polymers and having adjacent one face a zone of lesser permeability is made by casting on an impervious surface an aqueous solution of the polymers together with an electrolyte and a miscible organic solvent, gelling the cast layer and washing it with a solvent for the electrolyte while still on the casting surface, then stripping it.

PERMEABLE MEMBRANE AND METHOD OF MAKING AND USING THE SAME

This is a continuation of applicant's copending application Ser. No. 545,298, filed Apr. 26, 1966, new abandoned.

This invention relates to an anisotropic permeable (i.e. microporous) membrane of ionically associated polyelectrolytes and pertains more specifically to such a membrane in which the degree of permeability, i.e. the extent of porosity, varies from a zone adjacent a face of the membrane into the interior, and relates also to a method of making and using such a membrane.

While anisotropic permeable or microporous membranes of cellulosic esters have been proposed, they suffer from several disadvantages, the principal one of which is the relatively low rate of water transmissivity which can be obtained and the difficulty of controlling the degree of permeability of such membranes during their preparation.

Ultrafiltration through suitable microporous or semipermeable membranes has long been known as a method for separating selected solutes from their solution, the selection depending upon molecular size and shape. However, this method of separation has not been extensively used because of the lack of membranes having controlled permeability together with adequate strength and having at the same time a high flux rate or water transmissivity rate in combination with freedom from plugging. Membranes made in accordance with the present invention satisfy the foregoing requirements and can readily be reproduced by the method of the present invention within narrow limits of permeability.

One object of the present invention is accordingly to provide a permeable membrane having a high rate of water transmissivity and high strength.

Another object is to provide a permeable membrane having a zone of lower permeability adjacent one face of the membrane together with a body of higher permeability and characterized by long service life substantially free from plugging.

Still another object is to provide a membrane of the type described including a reinforcing member to provide greatly improved strength and burst resistance.

Still a further object is to provide a method of making such membranes which makes it possible to control the permeability to any desired value.

Other and further objects will be apparent from the description which follows.

It has been found that the foregoing objects may be achieved by forming a membrane of a gel structure having a lattice formed of two ionically associated polyelectrolytes under controlled conditions on a solvent impervious casting surface, then exposing the membrane while still on the casting surface to a solvent under controlled conditions. It has also been found that a reinforcing member in the form of a fibrous web, preferably an unwoven fibrous web, may be incorporated in the membrane while it is being formed to provide additional strength.

The ionically associated gel structure may be formed as described and claimed in the copending application of Alan S. Michaels et al. Ser. No. 341,834 filed Jan. 24, 1964, now abandoned in favor of continuation-in-part Ser. No. 610,266 filed Jan. 19, 1967, by forming an aqueous solution containing reactive quantities of a polyanionic organic polymer and of a polycationic organic polymer capable or reacting with each other to form a water-insoluble precipitate, and also containing sufficient electrolyte, which acts as an ion shield, and sufficient organic solvent, miscible with the aqueous electrolyte solution, to maintain the polymers in solution without precipitation. The gel may then be formed by removing the organic solvent or by reducing the activity of the electrolyte or both until a solid gel structure forms. The membrane of the present invention may be formed directly from a solution so prepared from two separate polymers by casting the solution into the desired shape on a casting surface, preferably a water impervious casting surface, then causing it to gel by reducing the electrolyte activity or removing the solvent, or both, or if desired such a gel previously formed, e.g. as a finely divided solid, may be dissolved in water containing sufficient ion-shielding electrolyte together with water miscible organic solvent to maintain the solid in solution and this solution may be cast, then caused to gel or solidify in the form of the desired membrane by reducing the activity of the electrolyte or removing solvent or both.

The polyelectrolyte polymers which may be used in forming the membranes of the present invention are organic polymers having dissociable ionic groups which impart electrolytic characteristics in forming salts and acids (in the case of anionic polyelectrolytes) and bases (in the case of cationic polyelectrolytes). Typical of these are the polymers of sodium styrene sulfonate and of vinyl benzyl trimethyl ammonium chloride, and other materials of the same general type having a synthetic organic polymeric structure, which, without the ionic groups (sulfonate or quaternary ammonium), would be a water-insoluble film-forming material. They are accordingly characterized by a sufficiently high molecular weight to be solid and capable of film formation (typically having a molecular weight greater than 50,000) while having sufficient dissociable ionic groups chemically bonded to the polymeric structure to be water-soluble. As a very general rule there should be at least one ionic group for every six repeating monomer (mer) units or for each average chain interval of 12 carbon atoms.

Accordingly, in addition to the preferred polymers of sodium styrene sulfonate and vinyl benzyl trimethyl ammonium chloride, copolymers of each of these materials with other vinyl compounds in molar ratios of 1:6 or less may be employed, as well as other well-known polyelectrolytes of the same general type, such as polyacrylic acid, hydrolyzed copolymers of styrene and maleic anhydride, polyvinyl sulfonic acid, sulfonated polystyrene, sulfonated polyvinyl toluene, alkali metal salts of the foregoing acidic polymers, polyethylenelmine, polyvinyl pyridine, and poly (dimethylaminoethyl methacrylate), quaternized polyethylene imine, quaternized poly (dimethylaminoethyl methacrylate), polyvinyl methyl pyridinium chloride, and the like. Of the polymers containing anionic groups, those containing sulfonate groups are preferred, while cationic polymers containing quaternary ammonium groups are preferred.

In general, the concentration of each polyelectrolyte polymer must be at least 0.5 percent by interaction preferably above 5 percent by weight of the total solution in order to obtain a satisfactory product. The relative proportions of the anionic and the cationic polymer may vary considerably from the amounts which are stoichiometrically equivalent. The ionically associated gel present in the membrane may contain up to 3 milliequavalents per gram of an excess of either cationic or anionic groups, or it may be ionically neutral. Because of impurities frequently present in the polyelectrolyte polymers, both cationic and anionic, used to form the membranes, and because of complications which may occur during their interaction with each other which affect the ionic nature of the gel product, the relative proportion of the two polyelectrolytes, when dissolved separately in the solution, may vary from 10:1 to 1:10 by weight, although they preferably are maintained within the range 5:1 to 1:5 by weight.

The electrolytes which may be used as ion shields in the solution include salts, acids, and bases; they must be present in an amount at least 10 percent by weight of the total solution. Although amounts as great as 50 percent or more by weight of the total solution may be used, it is unnecessary and frequently undesirable to employ much more than the minimum required to prevent precipitation of the polyelectrolyte polymers, i.e. more than about 20 percent by weight of the total solution. Among the salts, acids, and bases which may be employed are those which are soluble in water to the extent of at least 10 percent by weight at room temperature, which are highly ionized electrolytes in aqueous solution (having a pK less than 2.0), and which contain no ions which interact with the polyelectrolytes to precipitate them. Such salts include the alkali metal and the alkaline earth metal salts as well as beryllium, ferrous, nickelous, cobaltous, lanthanum, manganous, stannous, and tetramethyl ammonium salts as well as alkyl pyridinium salts in which the alkyl group has from one to three carbon atoms. These salts include the chlorides, bromides, nitrates and sulfates of all of the foregoing cations. In addition alkali metal chromates may be used as well as both alkali metal and alkaline earth metal perchlorates, perbromates and periodates. Acids which are useful include hydrochloric, hydrobromic, nitric, sulfuric, chromic, perchloric, perbromic, periodic, mono-, di-, and tri-chloroacetic, trifluroacetic, alkyl sulfonic (containing up to 20 carbon atoms in the alkyl group), and alkyl benzene sulfonic (containing up to 20 carbon atoms in the alkyl group). Bases which may be used include alkali metal hydroxides, barium hydroxide, tetramethyl ammonium hydroxide, and alkyl pyridinium hydroxides.

The aqueous solvent or solvent mixture from which the membrane is cast may be heated to temperatures no higher than about 100° C. in order to reduce the amount of ionic material and organic solvent required to maintain the polyelectrolytes in solution. The water-miscible organic liquid employed is an organic solvent, which must be miscible with the aqueous electrolyte solution and which preferably is water-miscible, which may have a volatility approximately as great as that of water or even greater, although relatively nonvolatile solvents may also be used. Suitable solvents include acetone, dioxane, methanol, ethanol, isopropanol, tert.-butyl alcohol, pyridine, morpholine, tetrahydrofuran, dimethyl sulfoxide, ethylene glycol, N-methyl pyrrolidone, 2-methoxy ethanol, dimethylformamide, dimethylacetamide, anyl alcohol, diacetone alcohol, and propylene carbonate. The solvent is used in amounts from 10 percent to 40 percent by weight of the total solution.

Mixtures of the various electrolytes may be employed to provide ion shielding, and such mixtures may include volatile electrolytes such as hydrochloric acid etc., nonvolatile electrolytes such as sulfuric acid etc., or both.

The desired ionically associated gel structure may be initially formed in any one of several different ways. The solution may be cooled so as to decrease the solvent power of the organic solvent or decrease the activity of the electrolyte and permit the solid to form. When a volatile liquid organic solvent is employed, or when the electrolyte or part of it is volatile, the volatile component may be evaporated. Indeed, when water is the only volatile ingredient present the gel structure may be formed by simply evaporating the water. In some cases it is also possible to initiate gelation by changing the pH of the solution. Gelation may also be initiated by dilution of the solution with water, for example, by casting a film of the solution upon an impervious casting surface, then immersing in water. In one preferred process of the present invention initial gelation is brought about by evaporation of one or more volatile ingredients from the solution, preferably a volatile electrolyte such as hydrochloric acid.

It is essential, in order that the membrane have the desired properties, that the composition, after casting in the form of a film or coating and while still in contact with a water-impervious and solvent-impervious casting surface, be subjected to a washing or extraction with water. While a portion membrane. The electrolyte and/or water-miscible organic solvent, which collectively serve as plasticizers for the ionically associated gel structure as well as serving, if present in large quantities along with water, to cause the polyelectrolyte polymers to be dissolved, may be removed before the water wash is begun, it is essential that the ionically associated gel structure contain a substantial amount of such plasticizers at the time the water wash begins. The relative proportions of polyelectrolyte polymers and plasticizer present in the composition at the time the water wash begins are what determines, to a great extent, the permeability of the membrane. The amount of plasticizer must be from 1 to 99 percent by weight of the total mixture of plasticizer and polyelectrolyte polymers at the time the water wash begins, preferably from 10 to 90 percent by weight. Best results have been obtained when the total amount of plasticizer is from 50 to 85 percent by weight of the total mixture of plasticizer and total polyelectrolyte polymer present at the beginning of the water wash.

In those cases where the amount of plasticizer which it is desired to have present at the beginning of the water wash is less than the amount needed to maintain the two polyelectrolyte polymers dissolved in the aqueous medium to permit casting of a film, a part or all of the water-miscible organic solvent and of the electrolyte may be volatile so that the plasticizer content of the composition can be reduced to the desired level by evaporation or volatilization of some or all of the volatile organic solvent and electrolyte.

The water wash may be carried out at a temperature from 40° C. to approximately 100° C. (the boiling point of water) while it still contains the desired amount of plasticizer. If a nonvolatile electrolyte and/or organic solvent are employed in sufficient amounts, the membrane may be dried on the casting surface during or after initial gelation, either at room temperature or at elevated temperatures, before being subjected to the water wash at elevated temperature. It is also possible, as pointed out above, to combine initial gelation with the water wash by immersing, for example, a layer of the solution on a casting surface in a water bath at the desired temperature, thereby reducing the activity of the electrolyte and causing an ionically associated gel structure to form and also washing the cast membrane to remove plasticizer therefrom, in which case the amount of plasticizer present at the beginning of the water wash will be the same as the total amount of electrolyte and organic solvent initially present.

If it is desired to have a reinforcing or supporting member present in the membrane, it is preferably incorporated before initial gelation occurs. The reinforcing member must have a porosity or permeability at least as great as that of the membrane and must have high tensile strength. Particularly suitable are fibrous webs, either woven or unwoven, such as woven glass cloth as well as woven cloth of various conventional natural and synthetic textile fibers such as cotton, linen, nylon (super polyamide), polyester (Dacron), cellulose esters and ethers, and the like. Excellent results have also been obtained by using as the reinforcing member an unwoven fibrous web such as paper formed of any of the preceding natural or synthetic fibers. Microporous synthetic plastics or metals may also be used to support or reinforce the membrane such as sintered polyethylene or sintered stainless steel; such microporous materials preferably have apertures with a nominal diameter of 1—100 microns. Although it is possible to deposit the layer of solution on a casting surface first, then immerse the reinforcing member in the solution, it is preferred first to place the reinforcing member on the casting surface, then apply the solution over the reinforcing member so that the latter becomes completely immersed.

While the overall thickness or gauge of the membranes of the present invention is not critical and may be varied over a wide range, it is preferred for most purposes that the thickness be from 1 to 20 mils while the reinforcing member, when present, usually varies from 1 to 10 mils in thickness.

Although organic solvents may be used for the essential washing procedure at elevated temperature in place of water, or mixtures of such organic solvents with water may be used, it is generally preferred to avoid such solvents because of their high cost, and to use water as the sole washing solvent. The wash water may contain dissolved in it various inorganic salts, the presence of such salts tending to produce membranes of lesser permeability than when pure water is employed as the washing medium. The permeability of the membrane may also be controlled by controlling the time period during which the washing is carried out. A very brief wash time of the order of 2 to 5 seconds at the minimum temperature of 40° C. suffices to produce satisfactory membranes. As the time period of the washing is increased the permeability of the membrane progressively decreases; in addition, as the temperature of the wash water is increased the permeability of the resulting membrane is decreased as compared to that of a membrane washed for the same length of time at a lower temperature. Washing for an hour at the temperature of boiling water produces a membrane which is substantially completely impermeable, but washing at a temperature below about 40° C. has substantially no effect upon permeability, even when continued for an hour or more, and consequently does not produce the anisotropic membrane of the present invention.

If the temperature employed for washing is less than about 90° C. it is desirable that the membrane be subsequently annealed by heating in water at a temperature above 90° C. for no more than 30 seconds, preferably for 3 to 5 seconds, in order to eliminate pinholes or discontinuities in the membrane and improve its solid retention characteristics. The annealing step (which may be combined with the washing step) affects the permeability of the membrane in the same way as does the washing step.

The permeability of the membrane may be controlled and adjusted not only be varying the conditions of the washing and/or annealing step, but also by varying the relative proportions of electrolyte and the polyelectrolyte polymers in the casting solution.

The anisotropic membrane must not be allowed to dry out completely after the washing step and before use. It is preferably stored in a water-filled sealed container, it should also be noted that the annealing step referred to above need not follow immediately upon the washing step, but may be postponed for as long as desired. The membrane must be maintained wet with water during the intervening period, however, and must not be allowed to dry out. Although it is essential that the membrane be maintained in contact with a water-impervious surface, e.g. the original casting surface, during the wash period while the zone of lower permeability is being formed, it may be stripped from the casting surface before the annealing step if desired, and may, of course, be stripped from the surface before being stored in water at room temperature. During any storage period, it is essential that the temperature of the membrane and the water in which it is stored be not permitted to rise above about 50° C., since exposure to higher temperatures will cause progressive decrease in permeability.

The membranes of the present invention are useful for a wide variety of ultrafiltration operations such as are involved in biological or pharmaceutical separations, protein concentration, sewage treatment, water clarification, sugar purification, bacteria or virus concentration or filtration, cold sterilization of wine, beer, or the like. In addition, they are useful in various analytical procedures. The membranes of the present invention may be used in separating or concentrating the ingredients of biological fluids such as urine and blood plasma, food products such as milk whey and fruit juices, and fermentation broths. In general, the membranes are employed by mounting them with suitable support, e.g. a sintered stainless steel plate, in a conventional pressure vessel and supplying the solution to be treated, containing a plurality of solutes of varying molecular size, to one side of the membrane and removing from the other side an aqueous solution containing the permeable solute while maintaining any desired pressure differential across the membrane, preferably a differential of 50—100 p.s.i. It is also possible to add water continuously to the solution to be treated to replace the water which is removed along with the membrane-permeable solute, thus maintaining the concentration of the retained nonpermeable solute substantially constant.

The membranes of the present invention are characterized by a unique zone of lower permeability adjacent the face which is exposed to water during the washing step, as pointed out above. This characteristic is of great practical importance in that when the membrane is used for ultrafiltration, any plugging of the membrane can readily be removed simply by reversing the flow for a short period of time. This anisotropic or nonuniform characteristic of the membrane is also evident by the dissimilar visual appearance of opposite sides of the membrane, the side of lower permeability having a higher sheen or gloss than the other. It is also evidenced by the strikingly dissimilar dye-absorption characteristics of opposite sides of the membrane. For example, when such a membrane is immersed in a solution of red acid fuchsin, almost no dye absorption occurs on the side of low permeability, whereas the opposite side becomes brightly colored.

The membranes of the present invention are also characterized by remarkably high water transmissivity properties. By proper control of the composition of the casting solution and of the washing and annealing conditions, for example, membranes may be produced having flow rates of the order of 50 to 175 gallons of distilled water per 24 hours per square foot of membrane area at a pressure differential of 100 pounds per square inch across the membrane. The permeability of the membranes is such that one having a water transmissivity of the order of 175 gallons per day per square foot at 100 p.s.i. retains completely dextran molecules having an average molecular weight of 10,000 while permitting raffinose, sucrose, sodium chloride, etc. to pass completely through; such a membrane will also retain approximately 80 percent of polyethylene glycol molecules having an average molecule of 6,000. On the other hand, the permeability of a membrane having a water transmissivity of the order of 60 gallons per day per square foot at 100 p.s.i. is such that it retains from 80 percent to 100 percent of raffinose molecules and retains 50 percent of sucrose molecules, while permitting passage of sodium chloride. Both membranes of course retain completely higher molecular weight solutes such as bovine serum albumin.

The following specific examples will illustrate more clearly the nature of the present invention without serving as a limitation upon its scope.

EXAMPLE 1

An ionically associated solid gel formed by reacting together equivalent weights of poly (vinyl benzyl trimethyl ammonium chloride) and poly (sodium styrene solfonate) was prepared as described in Michaels et al. Journal of Physical Chemistry, Vol. 65, pages 1765 et seq. (1961). One hundred parts by weight of the resulting dry, solid, neutral ionically associated polymer in finely divided form was dissolved with stirring in a solution containing 284 parts by weight of dioxane, 226 parts by weight of concentrated aqueous hydrochloric acid (37 percent HCl), and 54 parts by weight of distilled water.

A filter paper having a gauge of 4 mils and consisting of polyester fibers (Dacron) was secured with adhesive tape to a casting surface consisting of a smooth glass plate. The solution was then poured over the sheet of filter paper and drawn down by a conventional drawdown bar set at a clearance of 8 mils from the casting surface. Immediately after drawdown, the casting while still on the surface of the glass plate was immersed for approximately 2 to 3 seconds in a bath of water maintained at 60° C. The water bath contained 0.1 percent by weight of an anionic surface active agent, the dioctyl ester of sodium sulfosuccinate, in order to minimize the streaking of the casting which might otherwise occur. The casting, while still on the glass casting surface, was then immediately immersed in a second water bath maintained at room temperature. After immersion in the room temperature water bath for approximately 30 seconds, the casting, while still on the glass casting surface, was withdrawn and immersed for 5 seconds in a water bath maintained at 90° C., after which it was cooled to room temperature without drying by immersion in a second room temperature water bath for about 5 minutes.

The resulting membrane having a total thickness of approximately 8 mils was readily stripped from the casting surface while still wet and stored by immersion in a sealed container filled with water. It was found that little strike-through of the paper by the polymer had occurred, but that adhesion of the polymer to the paper was sufficient to prevent delamination even after wet storage for an extended period of time.

The foregoing membrane exhibited a water transmissivity rate, using distilled water, of 175 ± 25 gallons per 24 hours per square foot of membrane at a pressure drop of 100 pounds per square inch across the membrane, while at a pressure drop of 500 pounds per square inch the rate was approximately 880 gallons. In each case the membrane was supported by a sintered stainless steel support member. The membrane exhibited essentially no retention when used for filtration of an aqueous solution containing 0.25 percent by weight of raffinose at 100 p.s.i., but exhibited 80 to 100 percent retention of the solute in each case when used for ultra-filtration of aqueous solutions in the same concentration of polyethylene glycol (m.w. 6,000) and dextran (m.w. 10,000) at 100 p.s.i. The membrane was found capable of 100 percent retention of solute when used with an aqueous solution of 0.25 percent by weight of bovine serum albumin (molecule 69,000 at 100 p.s.i. In the case of the last three solutions, somewhat lower water transmissivity rates (of the order of 60 to 90 gallons per 24 hours per square foot) were observed at 100 p.s.i. than were observed with distilled water.

The membrane exhibited a tensile strength approximately equal to that of the paper used as a reinforcing member and a burst strength of approximately 25 p.s.i. as determined by Mullen burst tests.

EXAMPLE 2

One hundred parts by weight of the ionically associated dry, solid particulate polymer of example 1 together with five parts by weight of a nonionic flurochemical surface active agent (FC 170) were dissolved in a solution containing 252 parts by weight of ethanol, 252 parts by weight of aqueous hydrochloric acid (37 percent HCl and 63 parts by weight of distilled water. The surface active agent was employed merely to improve the casting characteristics of the solution and minimize streaking. A membrane was prepared from this solution by the same procedure as described in example 1.

It was found that the substitution of ethanol for dioxane in the casting solution led to the production of a membrane having lower permeability and also lower water transmissivity. This membrane when tested with aqueous solutions containing 0.25 percent by weight of sucrose or raffinose, exhibited a water transmissivity of approximately 50 to 75 gallons per 24 hours per square foot at a pressure drop of 100 p.s.i., and a transmissivity of approximately 200 gallons per 24 hours per square foot at 500 p.s.i. The membrane exhibited nearly 100 percent retention of raffinose and approximately 40 to 60 percent retention of sucrose from such solutions at 100 p.s.i.

The physical strength of this membrane was approximately the same as that of example 1.

EXAMPLE 3

One hundred parts by weight of the ionically associated dry, solid particulate polymer of example 1 together with five parts by weight of the same surface active agent as used in example 2 were dissolved in a solution containing 330 parts by weight of dioxane, 270 parts by weight of aqueous hydrochloric acid (37 percent), 150 parts of dimethylsulfoxide, 150 parts of sulfuric acid, and 65 parts of distilled water. A membrane drawdown was prepared on a glass plate substrate as in example 1. The membrane casting was then dried at 100° C. for 30 minutes during which time hydrochloric acid and dioxane solvent were substantially completely removed leaving a plasticized gel membrane structure containing sulfuric acid, dimethyl sulfoxide, and neutral polyion complex resin in the ratio of 1.5:1.5:1.0. The dried casting was subsequently immersed in a water bath maintained at 90° C. for five seconds, after which it was cooled to room temperature, without drying, by immersion in a second water bath at room temperature.

The resulting membrane, having a total thickness of approximately 8 mils, was readily stripped from the casting surface while still wet and stored in a sealed container filled with water. The foregoing membrane exhibited a water transmissivity rate, using distilled water, of 25 ±5 gallons per 24 hours per square foot of membrane at a pressure drop of 100 p.s.i. The membrane was supported on a sintered metal disc support membrane. The membrane exhibited no retention when used for ultrafiltration of an aqueous solution containing 0.25 percent by weight of urea, but exhibited 80—100 percent retention for raffinose solute at 5 percent weight concentration at 175 p.s.i. operation. The retention characteristic of the membrane for raffinose solute was found to be independent of solute concentration when the operating pressure was adjusted so that the net driving pressure (applied pressure less osmotic pressure of solute) is held constant.

EXAMPLE 4

An ionically associated solid gel was formed as generally described in Michaels et al., Journal of Physical Chemistry, Vol. 65, pages 1765 et seq. (1961), by reacting together poly (vinyl benzyl trimethyl ammonium chloride) and poly (sodium styrene sulfonate) in such a ratio that the ionically associated polymer produced contains an excess of anionic charges over cationic charges amounting to 0.3 meq per gram of resultant, dry polyion complex. One hundred parts by weight of the resulting dry, solid, ionically associated polymer in finely divided form was dissolved with stirring in a solution containing 254 parts by weight of ethanol, 254 parts by weight of concentrated aqueous hydrochloric acid (37 percent HCl and 63 parts by weight of distilled water. Five parts by weight of the surfactant of example 2 was added to this solution to improve the wetting characteristics of the solution and facilitate the casting of a continuous film.

A filter paper having a gauge of 4 mils and consisting of polyester fibers (Dacron) was secured with adhesive tape to a casting surface consisting of a smooth glass plate. The solution was then poured over the sheet of filter paper and drawn down by a conventional drawdown bar set at a clearance of 8 mils from the casting surface. Immediately after drawdown the casting while still on the surface of the glass plate was immersed for approximately 2 to 3 seconds in a bath of water maintained at 80° C. The water bath contained 0.1 percent by weight of an anionic surface active agent, the dioctyl ester of sodium sulfosuccinate, in order to minimize the streaking of the casting which might otherwise occur. The casting, while still on the glass casting surface, was then immediately immersed in a second water bath maintained at room temperature. After immersion in the room temperature water bath for approximately 30 seconds, the casting, while still on the glass casting surface, was withdrawn and immersed for five seconds in a water bath maintained at 98° C., after which it was cooled to room temperature without drying by immersion in a second room temperature water bath for about 5 minutes.

The resulting membrane, having a total thickness of approximately 8 mils, was readily stripped from the casting surface while still wet and stored by immersion in a sealed container filled with water. It was found that little strikethrough of the paper by the polymer had occurred, but that adhesion of the polymer to the paper was sufficient to prevent delamination even after wet storage for an extended period of time.

The foregoing membrane exhibited a water transmissivity rate, using distilled water, of 25 ± 10 gallons per 24 hours per square foot of membrane at a pressure drop of 100 pounds per square inch across the membrane, while at 500 p.s.i. the rate was approximately five times the 100 p.s.i. rate.

The membrane exhibited 90—100 percent retention of sucrose when used for the filtration of an aqueous solution containing 0.25 percent by weight of this solute at 100 p.s.i. regardless of solution pH. The membrane exhibited slight retention (**15 percent) for D-alanine (m.w. 89), DL-phenylalanine (m.w. 165), and L-tryptophane (m.w. 204) when filtering 0.25 percent by weight concentrations in water of these solutes with solution pH adjusted to 6. When solution pH was adjusted to 10, under which conditions the solutes are negatively charged because of their amphoteric character, the membrane exhibits 80—100 percent retention efficiency for these solutes.

The membrane exhibited a tensile strength approximately equal to that of the paper used as a reinforcing membrane and a burst strength of approximately 25 p.s.i. as determined by Mullen burst measurements.

Although specific embodiments of the present invention have been described, it is not intended to limit the invention solely thereto, but to include all of the obvious variations and modifications within the spirit and scope of the appended claims.

I claim:

1. An anisotropic permeable membrane consisting essentially of gel structure having a lattice formed of two ionically associated synthetic organic linear polymers, a first one of said polymers having dissociable anionic groups attached to a polymeric chain which without the said anionic groups forms a water-insoluble film forming resin, and the second of said polymers having dissociable cationic groups attached to a polymeric chain which without the said cationic groups forms a water-insoluble film forming resin, each of said polymers having sufficient dissociable groups to render it water-soluble in the absence of the other, said membrane being characterized by having a zone adjacent one face of substantially less permeability than the remainder of the membrane and having a thickness from 1 to 20 mils, said membrane permitting complete passage of sodium chloride therethrough.

2. A membrane as claimed in claim 1 in which said anionic groups are sulfonate groups and said cationic groups are quaternary ammonium groups.

3. A membrane as claimed in claim 1 in which said membrane is bonded to a reinforcing member of greater permeability than said membrane.

4. A membrane as claimed in claim 2 in which said membrane is bonded to a reinforcing member consisting essentially of an unwoven fibrous web.

5. A membrane as claimed in claim 4 in which said fibrous web consists essentially of polyester fibers.

6. A membrane as claimed in claim 4 in which one of said polymers is poly (sodium styrene sulfonate) and the other is poly (vinyl benzyl trimethyl ammonium chloride).

7. A membrane as claimed in claim 6 which is completely permeable to sodium chloride in aqueous solution and completely impervious to bovine serum albumin in aqueous solution.

8. The method of making an anisotropic membrane which comprises providing an aqueous solution containing a first polymer having dissociable anionic groups attached to a polymeric chain which without the said anionic groups forms a water-insoluble film forming resin, and a second polymer having dissociable cationic groups attached to a polymeric chain which without the said cationic groups forms a water-insoluble film forming resin, each of said polymers having sufficient dissociable groups to render it water-soluble in the absence of the other, together with at least 10 percent by weight based on the total solution of an electrolyte having a pK less than 2.0 and having no ions which react with said polymers to precipitate them, and at least 10 percent by weight based on the total solution of an organic solvent miscible therewith, casting said solution into a layer of desired thickness on a casting surface, gelling said layer of solution and, while the layer still contains as least 10 percent by weight of said electrolyte and solvent together, bringing one face only of said layer directly into contact with liquid water then stripping said layer from said casting surface in the form of an anisotropic permeable membrane having a thickness from 1 to 20 mils.

9. The method as claimed in claim 8 in which said gelling is produced by bringing one face only of said layer of solution directly into contact with water at a temperature from 40° C. to 100° C.

10. The method as claimed in claim 9 in which said electrolyte is hydrochloric acid.

11. The method as claimed in claim 9 in which said first polymer is poly (sodium styrene sulfonate) and said second polymer is poly (vinyl benzyl trimethyl ammonium chloride).

UNITED STATES PATENT OFFICE
CERTIFICATE OF CORRECTION

Patent No. 3,549,016            Dated December 22, 1970

Inventor(s) Peter Nicholas Rigopulos

It is certified that error appears in the above-identified patent and that said Letters Patent are hereby corrected as shown below:

Column 1, line 4, "new" should read -- now --;

Column 1, line 62, "or" should read -- of --;

Column 2, line 36, "polyethyleneimine" is misspelled;

Column 2, line 46, after "percent", omit "by interaction" and insert -- by weight, --;

Column 3, line 61, insert after "portion", -- of the electrolyte -- and delete "membrane. The electrolyte";

Column 5, line 20, "be" should read -- by --;

Column 7, line 17, close parenthesis after "69,000";

Column 7, line 31, "fluorochemical" is misspelled;

Column 7, line 34, close parenthesis after "HCl";

Column 8, line 29, close parenthesis after "HCl";

Column 8, line 71, "(** 15 percent)" should read -- (~ 15 percent) --;

Column 10, line 25, "as" should read -- at --.

Signed and sealed this 16th day of March 1971.

(SEAL)
Attest:

EDWARD M. FLETCHER, JR.            WILLIAM E. SCHUYLER, J
Attesting Officer                 Commissioner of Patent